(12) United States Patent
Chang et al.

(10) Patent No.: US 6,505,504 B1
(45) Date of Patent: Jan. 14, 2003

(54) METHOD AND DEVICE FOR A REAL TIME MEASUREMENT OF OUTPUT TORQUE OF AN AUTOMOBILE ENGINE

(76) Inventors: Keun-Ho Chang, RA-102 Samho Apt. Bangbae Dong, Sucho Ku, Seoul 137-069 (KR); Peter Taehwan Chang, RA-102 Samho Apt. Bangbae Dong, Sucho Ku, Seoul 137-069 (KR); Thomas Gihwan Chang, RA-102 Samho Apt. Bangbae Dong, Sucho Ku, Seoul 137-069 (KR)

( * ) Notice: Subject to any disclaimer, the term of this patent is extended or adjusted under 35 U.S.C. 154(b) by 0 days.

(21) Appl. No.: 09/700,189
(22) PCT Filed: May 10, 1999
(86) PCT No.: PCT/KR99/00227
   § 371 (c)(1),
   (2), (4) Date: Nov. 11, 2000
(87) PCT Pub. No.: WO99/58943
   PCT Pub. Date: Nov. 18, 1999

(30) Foreign Application Priority Data

May 13, 1998 (KR) .............................. 98-17071

(51) Int. Cl.⁷ .............................................. G01M 15/00
(52) U.S. Cl. ...................................................... 73/118.1
(58) Field of Search ............................... 73/116, 117.2, 73/117.3, 118.1

(56) References Cited

U.S. PATENT DOCUMENTS

| 4,513,626 A | * | 4/1985 | Obayashi et al. | ...... 73/862.328 |
| 4,513,628 A | * | 4/1985 | Kohama et al. | ........ 73/862.328 |
| 4,683,746 A | | 8/1987 | Cullingford et al. | ........ 73/118.1 |
| 4,697,460 A | * | 10/1987 | Sugiyama et al. | .......... 324/209 |
| 5,207,092 A | * | 5/1993 | Bruno | ........................ 73/118.1 |
| 5,596,153 A | | 1/1997 | Bulgrien et al. | ........ 73/862.326 |
| 6,269,702 B1 | * | 8/2001 | Lambson | ................ 73/862.045 |

* cited by examiner

*Primary Examiner*—Eric S. McCall
(74) *Attorney, Agent, or Firm*—Ohlandt, Greeley, Ruggiero & Perle L.L.P.

(57) ABSTRACT

This invention is a device for real-time measurement of torque output from an automobile engine. The device measures the deformation of damper springs of a planar clutch plate and interprets the deformation as the output torque while the automobile is in operation. The device is comprised of (i) a planar disc clutch plate which includes damper springs, (ii) first and second sets of posts which are welded onto the clutch plate, (iii) a signal pick-up sensor and (iv) an electronic circuit to process the picked-up signals.

3 Claims, 6 Drawing Sheets

(a)

(Applyed Torque is Zero)

(b)

(Applyed Torque is Non-Zero)

METHOD AND DEVICE FOR A REAL TIME MEASUREMENT OF OUTPUT TORQUE OF AN AUTOMOBILE ENGINE

TECHNICAL FIELD

The present invention generally relates to a real time measurement of torque output from an engine to a transmission of an automobile, and more particularly to a device and a method for real time measurement of torque output from an engine to a transmission having a plate type clutch by means of the interaction of a clutch plate and damper springs of the clutch.

BACKGROUND ART

One of the most important goals in engine development is to maximize output power while minimizing fuel consumption. To assess this goal, the measurement of engine output torque is essential. Yet currently available technologies measure the revolution speed (rpm) of the engine and not the output torque while the engine is running. Power is, by definition, torque multiplied by the angular velocity. At present, torque measurement requires special equipment and set up.

There are basically two ways of torque measurements. The most common method is to acquire torque by separately measuring power and angular velocity and subsequently dividing the power by the angular velocity. The other method is to acquire torque by measuring minute twists of the clutch axle of a power train by means of a strain gauge attached to a surface of the clutch axle and detecting signals indicating the measured twist through slip rings incorporated onto the clutch axle. Both of the above methods are applicable only when the engine is tested on a test bench, but not when the engine is mounted on an automobile.

A recently reported new technology makes use of magneto-elasticity of certain materials. This technology is also based on the measurement of minute twists of the clutch axle, yet it is applicable for real-time measurements during the operation of an engine. The measurement of the magneto-elasticity involves some modification of the clutch axle of the power train.

DISCLOSURE OF INVENTION

Therefore, this invention is intended to solve the problems of the prior art torque measurements. This invention provides a device and a method for real time measurement of instantaneous torque output from an automobile engine while the engine is mounted on the automobile and running.

According to the invention, there is provided a device for real time measurement of torque output from an engine to a transmission of an automobile comprising a plate type clutch with a clutch plate for intermitting the engine power, a clutch shaft for connecting the clutch plate to a transmission, and an axle guide tube for surrounding the clutch shaft over a length of the clutch shaft. The clutch plate comprises a lower body member with annular frictional materials attached along peripheries on both sides thereof and formed with a first aperture at a central portion thereof, an intermediate body member with a hub penetrated into and attached to the intermediate body member at a central portion thereof, and an upper body member formed with a second aperture at a central portion thereof and adapted to be positioned onto the intermediate body member. The hub is adapted for coupling with the clutch shaft. A lower portion of the hub is inserted into the first aperture and an upper portion of the hub is inserted into the second aperture. The intermediate body member is adapted to be positioned onto the lower body member. The lower and upper body members are fixedly fastened together with the intermediate body member interposed therebetween to be circumferentially displaced relative to the lower and upper body members by a damper spring means. The device includes signal-producing reference means formed on the clutch plate, at least one sensor mounted into a mounting aperture in a leading end portion of the axle guide tube to be positioned radially inside the signal-producing reference means and to face the signal-producing reference means, and computing means for receiving a signal output from the sensor and for computing the engine torque based on the signal. The signal-producing reference means includes a first plurality of axially extending posts formed equidistantly around a periphery of the upper portion of the hub, and a second plurality of axially extending posts formed equidistantly around a circumference of the second aperture of the upper body member. The first posts are disposed radially inside the second posts.

The invention accomplishes the torque measurement by sensing the deformation of the damper spring means. When the automobile engine delivers torque to the transmission, the torque is relayed by the damper spring means. The spring means are compressed proportionally to the torque which the spring means relays to the transmission. The degree of compression of the damper spring means is non-contactively measured and the measured data is transmitted from the interior of the clutch to the exterior computing means while the clutch plate is rotating together with the engine output shaft.

The precise measurement of instantaneous torque enables one to facilitate a feed-back control in the engine control unit. Instantaneous torque measurement may provide information on the state of the engine as well.

MODE FOR CARRYING OUT THE INVENTION

Figure 1:
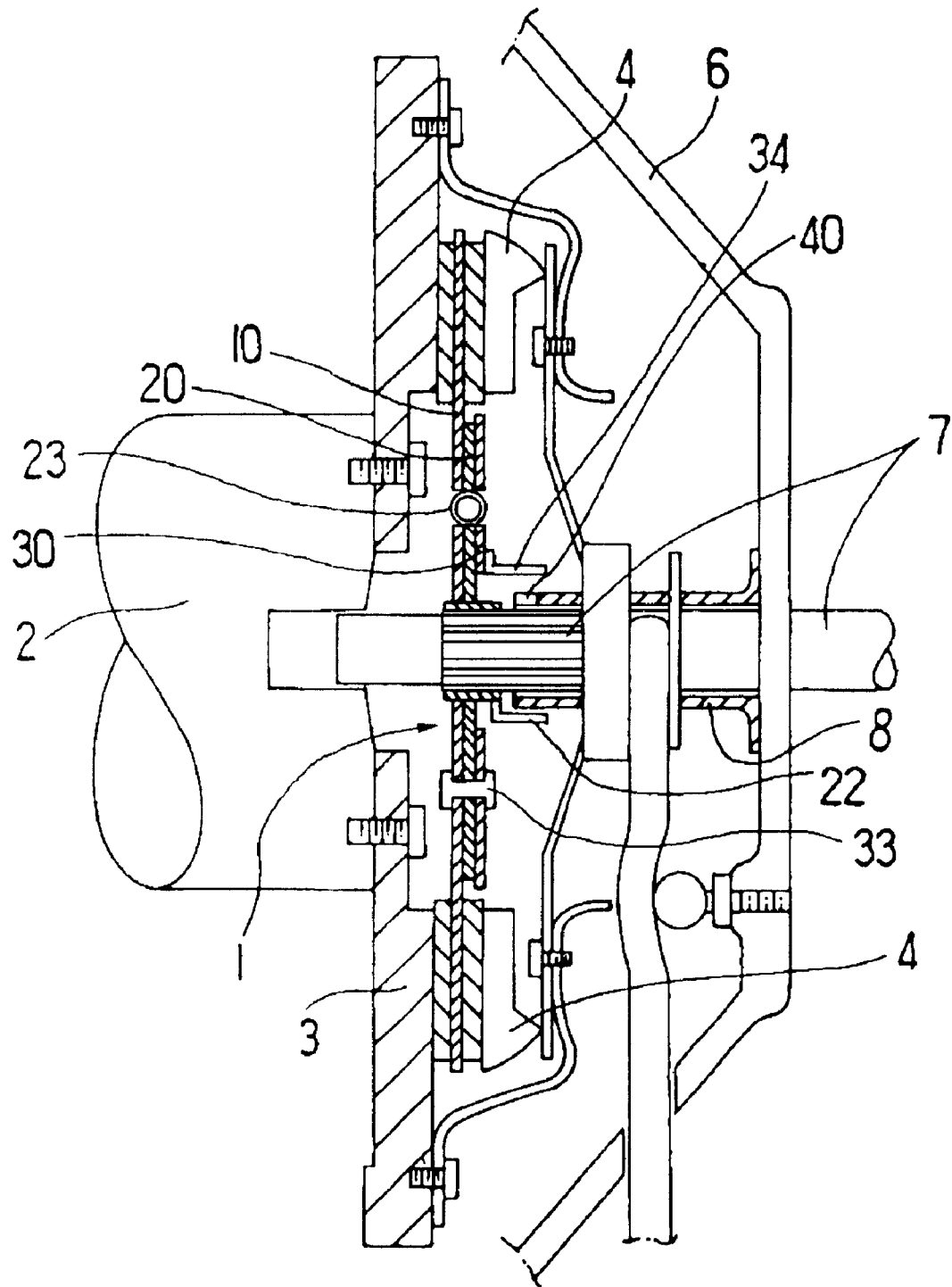
FIG. 1 is a partially sectioned, schematic side view of a clutch incorporating a portion of a device for real time measurement of torque output from an engine according to the present invention.

FIG. 1 shows a clutch incorporating a portion of the device for real time measurement of torque output from an engine according to the present invention.

A clutch plate 1 of the clutch, which relays the rotational power of an engine shaft 2 to a clutch shaft 7 for connecting the clutch plate to a transmission, is located between a flywheel 3 and a pressure plate 4. When urged by the pressure plate 4, the clutch plate 1 is pressed against the flywheel 3 and the clutch plate 1 rotates with the flywheel. Therefore, the clutch shaft 7 spline-coupled to the clutch plate 1 via a hub rotates with the clutch plate 1. When the pressure plate 4 is retracted to relieve the pressure, the clutch plate together with the clutch shaft does not receive rotational power from the engine.

Figure 2:
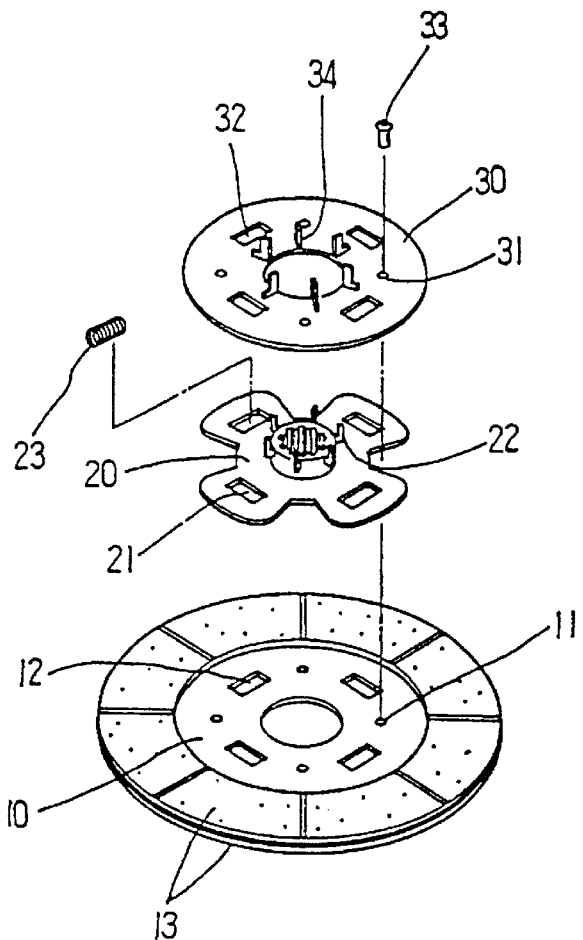
FIG. 2 is an exploded perspective view of a clutch plate with respective posts formed on an upper body member and a hub of the clutch plate, respectively.
Figure 3:
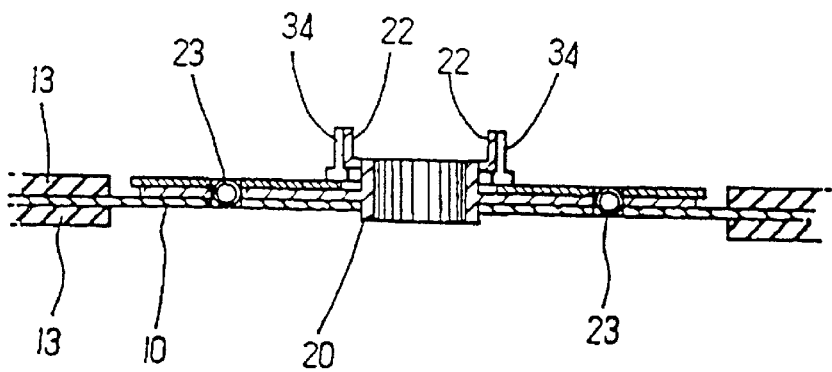
FIG. 3 is a sectional view showing the assembled state of the clutch plate shown in FIG. 2.

Referring to FIGS. 2 and 3, the clutch plate 1 includes a lower body member or base plate 10, an intermediate body member or teeth body 20, and an upper body member or top plate 30. The base plate 10 has annular frictional materials 13 attached along peripheries on opposed sides and is formed with a first aperture at a central portion. The teeth body 20 has a hub penetrated into and attached to the teeth body at a central portion. The top plate 30 is formed with a second aperture at a central portion and adapted to be positioned onto the teeth body. The hub is adapted for the spline coupling with the clutch shaft 7. A lower portion of the hub is inserted into the first aperture and an upper portion of the hub is inserted into the second aperture. Rivets 33 fasten the top plate 30 and the base plate 10 through rivet holes 11 and 31 therein. The teeth body is kept between the two plates, but is rotatable by a small angle between the adjacent rivets. Each of spring wells 12, 32 and 21 in the respective plates and teeth body is aligned together and captures a damper spring 23 therein. When the pressure plate 4 urges the clutch plate 1 towards the flywheel 3, the rotational power of the engine is delivered to the base plate 10 of the clutch plate 1 with the friction coupling between the friction materials 13 of the opposed surfaces of the base plate 10 and the flywheel 3 and the pressure plate 4. The rotational power delivered to the base plate 10 acts on and compresses the damper springs 23. The damper springs 23 in turn deliver the rotational power to the teeth body 20. The teeth body 20 turns the clutch shaft 7 with the spline coupling between the hub at the center of the teeth body 20 and the clutch shaft 7. This configuration permits the transfer of the engine power to the clutch shaft 7 through the compression of the damper springs 23 as relaying members.

Figure 4:
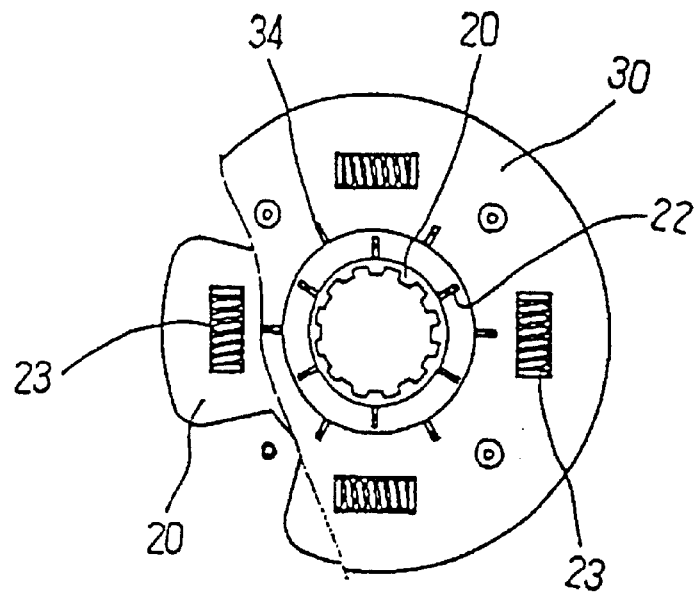
FIG. 4 is a partially cut-away plan view of the clutch plate when no torque is applied.

To achieve the real time measurement of torque output from the engine according to the invention, two augmentations are incorporated as signal-producing reference means into the clutch plate 1. The augmentations are a first plurality of axially extending posts 22 formed equidistantly around the periphery of the upper portion of the hub and a second plurality of axially extending posts 34 formed equidistantly around a circumference of the second aperture of the top plate 30, as shown in FIGS. 2 and 3. In FIG. 2, six of the first posts 22 are welded on the hub of the teeth body 20 and six of second posts 34 are disposed on the top plate 30. FIG. 4 shows the relative positioning of the first and second posts in the assembled clutch plate. The first posts 22 are disposed radially inside the second posts 34. Preferably, each of the first posts is located equiangularly relative to circumferentially adjacent two second posts. The exact number of first and second posts required can be varied depending on specific design needs.

Figure 5:
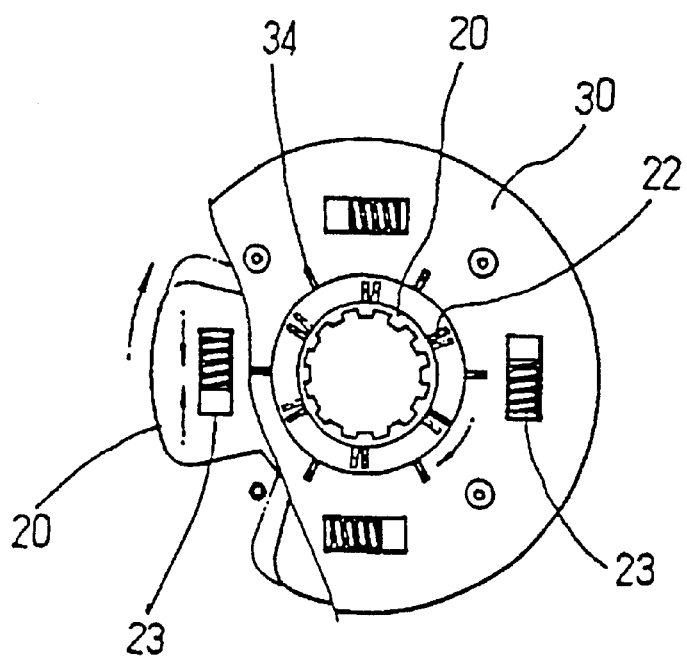
FIG. 5 is a partially cut-away plan view of the clutch plate similar to FIG. 4 but when torque is applied.
Figure 6:
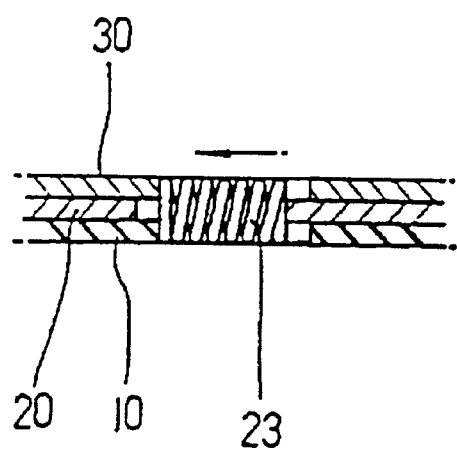
FIG. 6 is a longitudinally sectioned fragmentary view showing a damper spring inserted into the clutch plate.

FIG. 5 shows the first posts on the hub of the teeth body slightly displaced circumferentially from their original positions relative to the second posts, and FIG. 6 is a longitudinally sectioned fragmentary view showing the damper spring inserted into the clutch plate. The state shown in FIG. 5 occurs when the damper springs are forcibly compressed due to the torque or power relayed by the damper springs from the engine to the clutch shaft. The arrow in FIG. 6 indicates the direction of compression of the damper spring. The measurement of torque is accomplished by detecting an angular displacement of these posts and transmitting the detected signals indicating the angular displacement into a computing means external to the clutch assembly.

Figure 7:
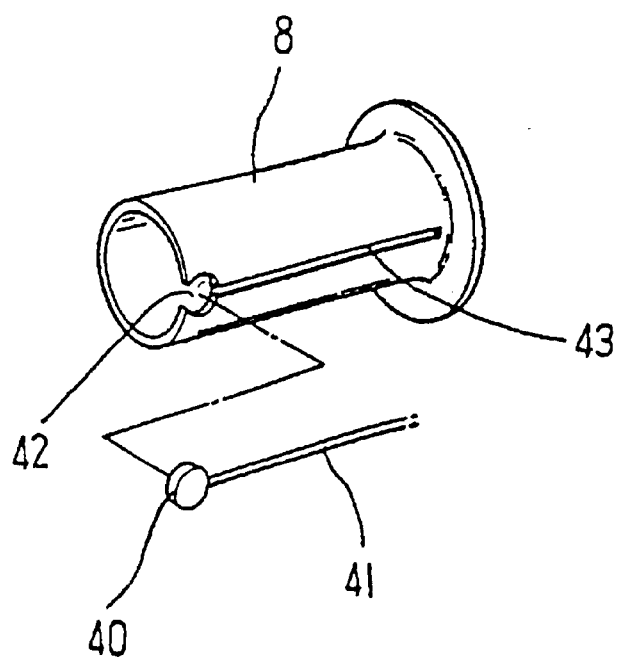
FIG. 7 is a perspective view of an axle guide tube and a pickup sensor adapted for installation to the axle guide tube.

FIG. 7 is a perspective view of an axle guide tube 8 and a pickup sensor 40 to be installed in the axle guide tube. The axle guide tube 8 surrounds the clutch shaft 7 over a length of the clutch shaft. According to the invention, the axle guide tube 8 is slightly modified to have a sensor mounting aperture 42 at the leading end portion thereof and a wire trough 43 which is contiguous to the sensor mounting aperture and extends at a predetermined length over the length of the axle guide tube. The pickup sensor 40 is installed in the sensor mounting aperture 42. When finally assembled with the clutch plate, the pickup sensor 40 is positioned radially inside the first and second posts and faces them. Lead wires 41, preferably a pair of wires, from the pickup sensor are fitted into and brought out through the wire through. The wires 41 transmit signals output from the pickup sensor to the computing means. For certain applications, more than one pickup sensor may be needed and the number of the sensor mounting apertures and the wire troughs may increase with the number of the pickup sensors.

Figure 8:
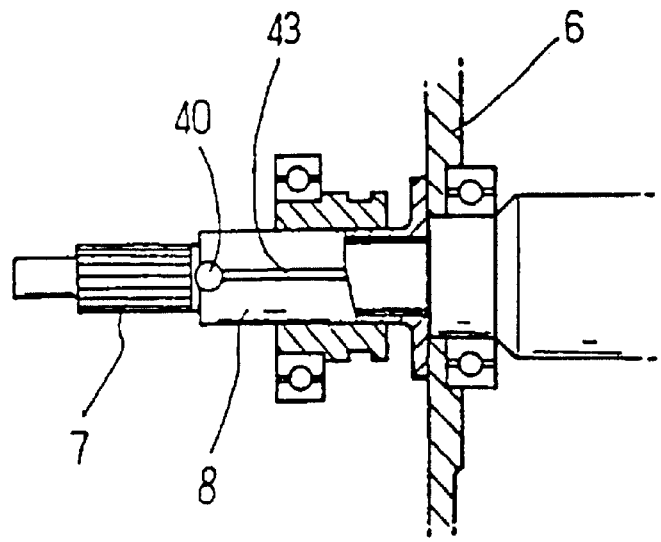
FIG. 8 is a partially cut-away, sectioned side view of the axle guide tube when assembled.

Referring to FIG. 8, the axle guide tube 8 in which the pickup sensor 40 is installed is fixedly bolted inside a clutch housing 6 which has been previously bolted in place, and the clutch shaft 7 passes through the inside of the axle guide tube 8. The clutch shaft 7 is spline-coupled with the hub of the clutch plate 1 (not shown in FIG. 8) and rotates with the clutch plate 1.

Figure 9:
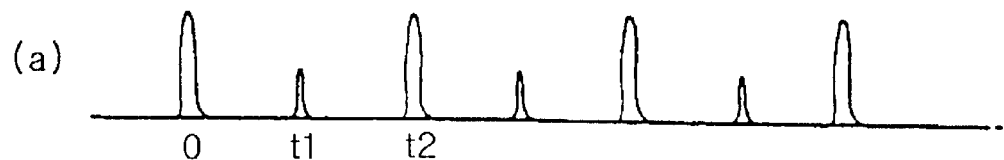
FIG. 9 depicts output signals from the pickup sensor, wherein (a) is a diagram when applied torque is zero and (b) is a diagram when applied torque is non-zero.
Figure 9:

In operation, the first and second posts 22 and 34 rotate with the clutch plate 1 and pass over the bottom surface of the pickup sensor 40. When the posts pass over the bottom surface of the pickup sensor 40, signals as shown in FIG. 9 are produced. The taller pulses represent signals indicating the passage of the first posts 22 which are closer to the bottom surface of the pickup sensor, and the smaller pulses represent signals indicating the passage of the second posts. The time intervals of the signals produced from the pickup sensor when posts pass over the sensor are measured. When no torque is applied, the signals as shown in FIG. 9(a) are produced from the pickup sensor. When non-zero torque is applied, the signals as shown in FIG. 9(b) are produced from the pickup sensor. The displacement of the smaller pulses in the FIG. 9(b) increases proportionally with the increase of the applied torque. The measured time intervals of the signals which are proportional to the angular relative displacement of the posts can be converted to torque values by appropriate conversion formula previously stored in the computing means.

Although one pickup sensor is used in this embodiment, a plurality of pickup sensors 40 may be used such that they are placed around the circumference of the axle guide tube 8. With one pickup sensor, the number of data acquisition per one revolution of the engine is limited to the pair numbers of the first and second posts 22 and 34. With six pairs of the first and second posts 22 and 34 as shown in FIGS. 4 and 5, six data points are acquired for each revolution of the engine, or one data point for every 60 degrees of turn. If the number of the pickup sensors 40 is increased to 4, then data will be available for every 15 degrees of turn.

Figure 10:
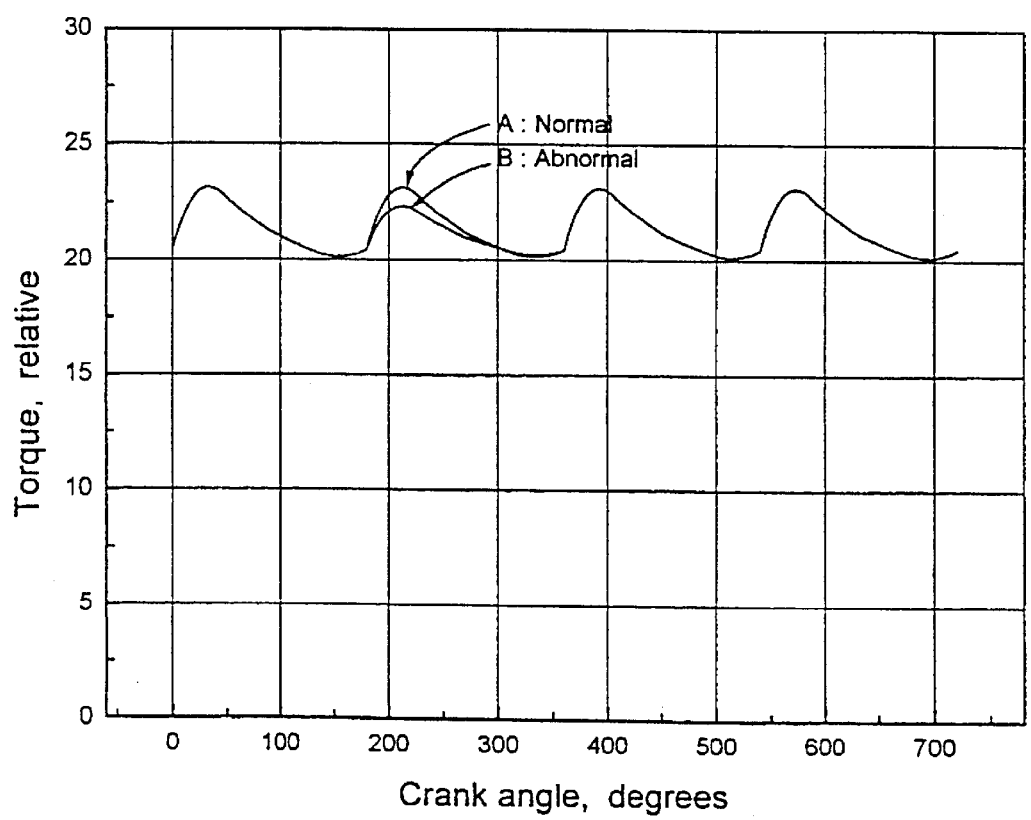
FIG. 10 is a graph showing one example of relative torque measured and computed by the present invention, with regard to crank angles of the engine.

FIG. 10 shows simulated output torque variations as a function of the crank angle of a 4-stroke, 4-cylinder engine.

Reference character A in FIG. 10 represents torque variations for an ideal case, and reference character B represents a torque variation when the number two cylinder was partially misfiring. The data points were acquired for every 15 degrees of turn. FIG. 10 shows that real time instantaneous detection of torque output from an engine can be used to diagnose engine performance and even identify the specific cylinder that is misfiring.

Although the device of the invention has been described and illustrated for a specific embodiment, the invention is not intended to be limited to the embodiment and may be greatly varied especially with regard to construction without departing from the guiding principles disclosed above and claimed below. For example, by appropriately selecting materials and configurations for the posts, other desired signal forms may be obtained.

Industrial Applicability

The output power of an automobile engine is a function of many parameters such as, amount of intake air, air-fuel ratio, ignition timing, road condition (load), and the like. The existing technology which measures the rotational speed and the above parameters, controls the engine by a heuristic approach. There is a need to improve the prior art technology. By being able to measure the output torque instantaneously according to the present invention, a feedback control can be applied to achieve the best performance for an engine. Further, the device of the invention is readily adaptable to a conventional clutch system with minimal modification, and its assembly to and disassembly from the clutch system can be effectuated with ease.

What is claimed is:

1. A device for real time measurement of torque output from an engine to a transmission of an automobile comprising:

a plate type clutch with a clutch plate for intermitting the engine power;

a clutch shaft for connecting said clutch plate to a transmission;

an axle guide tube for surrounding said clutch shaft over a length of said clutch shaft, wherein said clutch plate includes a lower body member with annular frictional materials attached along peripheries on both sides thereof and formed with a first aperture at a central portion thereof, and an intermediate body member with a hub penetrated into and attached to said intermediate body member at a central portion thereof, said hub being adapted for coupling with said clutch shaft and a lower portion of said hub being inserted into said first aperture, said intermediate body member being adapted to be positioned onto said lower body member, and an upper body member formed with a second aperture at a central portion thereof and adapted to be positioned onto said intermediate body member, an upper portion of said hub being inserted into said second aperture, said lower and upper body members being fixedly fastened together with said intermediate body member interposed therebetween to be circumferentially displaced relative to said lower and upper body members by a damper spring means;

a signal-producing reference means formed on said clutch plate, wherein said signal-producing reference means includes a first plurality of axially extending posts formed equidistantly around a periphery of said upper portion of said hub, and a second plurality of axially extending posts formed equidistantly around a circumference of said second aperture of said upper body member, said first posts being disposed radially inside said second posts;

at least one sensor mounted into a mounting aperture in a leading end portion of said axle guide tube to be positioned radially inside said signal-producing reference means and to face said signal-producing reference means; and computing means for receiving a signal output from said at least one sensor and for computing the engine torque based on said signal.

2. The device of claim 1, wherein said axle guide tube comprises a trough which is contiguous to said sensor mounting aperture and extends a predetermined length over the length of said axle guide tube, and wherein a pair of wires for transmitting said signal output from said sensor to said computing means is fitted into said trough.

3. The device of claim 1, wherein each of said first plurality of axially extending posts is located equiangularly relative to two circumferentially adjacent posts of said second plurality of axially extending posts.

* * * * *